US011368833B2

(12) United States Patent
Jamoussi (10) Patent No.: US 11,368,833 B2
(45) Date of Patent: Jun. 21, 2022

(54) ANNOUNCED ROAMING LOCATION (AROL) SERVICE (71) Applicant: Mohamed Jamoussi, Tunis (TN)

(72) Inventor: Mohamed Jamoussi, Tunis (TN)

(73) Assignee: Mohamed Jamoussi (TN)

( * ) Notice: Subject to any disclaimer, the term of this patent is extended or adjusted under 35 U.S.C. 154(b) by 0 days.

(21) Appl. No.: 16/758,029

(22) PCT Filed: Oct. 24, 2017

(86) PCT No.: PCT/IB2017/056589
§ 371 (c)(1),
(2) Date: Apr. 21, 2020

(87) PCT Pub. No.: WO2019/077396
PCT Pub. Date: Apr. 25, 2019

(65) Prior Publication Data
US 2020/0322779 A1  Oct. 8, 2020

(51) Int. Cl.
*H04W 8/12* (2009.01)
*H04M 15/00* (2006.01)
(Continued)

(52) U.S. Cl.
CPC ......... *H04W 8/12* (2013.01); *H04M 15/8038* (2013.01); *H04W 8/06* (2013.01); *H04W 8/18* (2013.01)

(58) Field of Classification Search
CPC .......... H04W 8/12; H04W 8/18; H04W 8/06; H04W 8/14; H04W 8/02; H04W 8/04; H04W 8/08; H04W 8/10; H04W 88/02; H04W 88/00; H04W 76/00; H04W 76/10; H04W 80/00; H04W 80/02; H04W 80/04; H04W 64/00; H04W 68/12; H04W 4/24; H04W 4/30; H04W 8/20; H04W 4/029; H04M 15/00; H04M 15/8038; H04M 2215/34; H04M 2215/7442; H04M 3/42025; H04M 3/42034; H04M 3/42042;
(Continued)

(56) References Cited
U.S. PATENT DOCUMENTS

2003/0083991 A1* 5/2003 Kikinis .......................... 705/40
2004/0053618 A1* 3/2004 Leppanen et al. ............ 455/445
(Continued)

FOREIGN PATENT DOCUMENTS

GB  2 386 300 A  * 9/2003 ............ H04M 15/00

*Primary Examiner* — Meless N Zewdu (57) ABSTRACT

ANNOUNCED ROAMING LOCATION (ARoL) SERVICE is a telecom service that permits a better management of received calls when travelling abroad. The ARoL service main idea is to inform a caller—calling an ARoL subscriber—where he is roaming and the local time there. This service is proposed with two levels:
  Basic ARoL Level—where the caller is simply informed about the country where the called ARoL subscriber is roaming and the local time there.
  Advanced ARoL Level—where the caller is further offered the option of assuming roaming charges.
By offering this service, a Mobile Operator aims further enhancements of its customers' retention and loyalty, and creation of a new revenue stream.

6 Claims, 8 Drawing Sheets

(51) Int. Cl.
*H04W 8/06* (2009.01)
*H04W 8/18* (2009.01)

(58) Field of Classification Search
CPC ......... H04M 3/42051; H04M 3/42059; H04M 3/42068; H04M 3/42076; H04M 3/42085; H04M 3/42093; H04M 3/42102; H04M 3/4211; H04M 3/42119; H04M 3/42127; H04M 3/42136; H04M 3/42144; H04M 3/42153; H04M 2215/68; H04M 2215/66; G06F 9/4451
See application file for complete search history.

(56) References Cited

U.S. PATENT DOCUMENTS

| | | | |
|---|---|---|---|
| 2005/0250493 A1* | 11/2005 | Elkarat et al. | 455/432.1 |
| 2006/0025109 A1* | 2/2006 | Levitan | 455/406 |
| 2008/0139202 A1* | 6/2008 | Wang et al. | 455/432.1 |
| 2009/0247119 A1* | 10/2009 | Kramarz-Von Kohout | 455/406 |
| 2010/0048197 A1* | 2/2010 | Jinag | 455/422.1 |
| 2010/0203863 A1* | 8/2010 | Kapelushnik et al. | 455/406 |
| 2010/0329443 A1* | 12/2010 | Montaner Gutierrez et al. | 379/221.01 |
| 2011/0177797 A1* | 7/2011 | Vendrow et al. | 455/414.1 |
| 2012/0157094 A1* | 6/2012 | Cheng et al. | 455/433 |

\* cited by examiner

FIG. 1 – Voice Message for ARoL Basic Level

FIG. 2 – Voice Message for Unreachability

FIG. 3 – Voice Message for ARoL Advanced Level

FIG. 4 – Contact Duplication & Update

FIG. 5 – Regular Display

FIG. 6 – Modified Display

FIG. 7 – Main Network Components

FIG. 8 – ARoL Service

ANNOUNCED ROAMING LOCATION (AROL) SERVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

FIELD OF THE INVENTION

The present invention relates to the field of mobile telecommunications, and more specifically to the field of mobile based services that incur roaming and similar charges, where a method of announcing the roaming information (time and location) of a roaming called subscriber is proposed, as well as assuming roaming charges in certain cases.

BACKGROUND OF THE INVENTION

In the mobile telecom world, each mobile phone is registered within his geographic home area to the Mobile Operator, subscribed to, through a local Visited Location Register (VLR) and the Home Location Register (HLR) of this Mobile Operator, known as Home Mobile Operator. Moving out of this area, this mobile phone will be in a roaming state, being registered with a foreign or visited VLR of another Mobile Operator, known as Hosting Mobile Operator. Of course, it is assumed that there is a roaming agreement between both Operators (Home and Hosting). Accordingly, the Hosting Mobile Operator will provide all roaming capabilities and services to enable the roaming subscriber to communicate seamlessly as if he is back home. The foreign or visited VLR checks the corresponding HLR (of Home Mobile Operator) to verify the mobile and then allows a communication to proceed (voice or data). The HLR makes a note of the currently responding VLR so that any communication to the registered mobile can be routed from the HLR to the VLR and the communication can be completed.

From another standpoint, when a voice call is initiated to a roaming subscriber, a major issue is likely to happen: for instance, if a time difference between the location of the caller and the roaming callee (called subscriber) is considerable and matter of several hours, then it becomes an inconvenience for the callee, not meant by the caller—not aware of the callee location and the time at his end—such as daytime for the caller but midnight for the callee. As a matter of fact, in the conventional roaming, information such as the physical location of callee (abroad or back home) as well as the local time at the callee end are hidden to the caller. Consequently, it is possible for a caller to initiate an unimportant call at an inappropriate time to a callee, especially if the callee is a frequent business traveller. As a result, the roaming callee may feel embarrassed answering an incoming call at an inappropriate time or being unnecessary, and also being charged roaming fees—frequently high.

Such type of issues (time convenience, roaming fees) force roaming services to be minimally used by roaming subscribers. In fact, for business subscribers, maybe roaming fees are not important, but time convenience is. While, for personal subscribers, although time convenience is considered, but expensive applied roaming rates are the key brake to reduced roaming services usage.

BRIEF SUMMARY OF THE INVENTION

In view of what has been addressed in the BACKGROUND OF THE INVENTION section, this invention relates to a telecom mobile service, named ARoL (Announced Roaming Location) service, and where its main objective is to permit to its subscriber a better management of his received calls when travelling abroad. The ARoL service main idea is to inform a caller—calling an ARoL subscriber—that the called number is roaming abroad, the country (not the city) where he is roaming and the local time there, in order to decide either to continue with the call or to call at a more convenient time. At an advanced step, when the caller and the callee are subscribers of the same mobile operator, the caller is offered the option to continue with the initiated call and to assume the roaming charges.

The AROL service has two levels:
Basic AROL (Level 1)—addressed to a caller, calling a roaming AROL subscriber, who is NOT a customer of the HMNO.
Advanced AROL (Level 2)—addressed to a caller, calling a roaming AROL subscriber, who is a customer of the HMNO. In other words, the caller and the AROL subscriber (the callee) are customers of the same Mobile Operator.

In terms of subscriptions, the Mobile Operator—offering AROL service—will be offering two types of subscription to its customers willing to subscribe to this service: Basic AROL Subscription and Advanced AROL Subscription. Then, based on the type of subscription, a new Advanced AROL subscriber is expected to duplicate and update his contacts (who are, basically, customers of the HMNO) in order to detect free roaming-charges calls, when traveling abroad. The expected type of update is based on the "2-digit" extension that the Mobile Operator will attach the caller MSISDN, and which will be forward it to the callee mobile phone.

Finally, this new proposed AROL service can be offered to all business and residential, postpaid and prepaid customers. By offering this service, a Mobile Operator will aim increasing its customers' retention and loyalty, generating new revenues, and therefore increasing its ARPU.

BRIEF DESCRIPTION OF THE SEVERAL VIEWS OF THE DRAWINGS

FIG. 1—Voice Message for AROL Basic Level.

FIG. 2—Voice Message for Unreachability.

FIG. 3—Voice Message for ARoL Advanced Level.

FIG. 4—Contact Duplication & Update.

FIG. 5—Regular Display—When Pressing (1)

FIG. 6—Modified Display—When Pressing (2)

FIG. 7—Main Network Components, Including Proposed ARoL Server.

❶—Home Network Operator

❷—Home Location Register (HLR)

❸—Proposed ARoL Server

❹—Gateway MSC (GMSC)

❺—Mobile Switching Center (MSC)

❻—Visited Location Register (VLR)

❼ ❽—Other Network Operators

FIG. 8—ARoL Service.

❶—Home Mobile Network of the ARoL Subscriber "A"

❷—Home Location Register (HLR)

❸—Proposed ARoL Server

❹—Gateway MSC (GMSC)

❺—Mobile Switching Center (MSC)

❻—Visited Location Register (VLR)

❼ ❽—Other Network Operators

⑨—A call to an ARoL Subscriber (On-Net, Off-Net, or International)

⑩—$MSISDN_{ARoL}$ transmitted to the GMSC

⑪—$MSISDN_{ARoL}$ transmitted from GMSC to HLR

⑫—Country & Local time of "Visited Network" transmitted to "ARoL Server"

⑬—Corresponding recorder voice message transmitted to the Caller

⑭—Caller Selection

DETAILED DESCRIPTION OF THE INVENTION

The ARoL service has two levels:

Basic ARoL (Level 1)—addressed to a caller—calling an ARoL subscriber—who is NOT a customer of the HMNO. The caller is a customer of another Telco Operator—either within the same country or in another country.

Advanced ARoL (Level 2)—addressed to a caller—calling an ARoL subscriber—who is a customer of the HMNO. In other words, the caller and the ARoL subscriber (the callee) are customers of the same Mobile Operator.

For the determination of the location and the local time, the NITZ feature can be used and the information forwarded to the mobile phone can be shared between the VLR to which the ARoL subscriber is attached (in the visited country where roaming) and the HLR of the HMNO.

It is important to note that the ARoL service is NOT an IMR service, requiring international agreements between operators. It is a local service that an operator is offering to its customers. Also, it is important to note that this service is optional in roaming situations.

As a matter of fact, while one of the main features of mobile communication is to hide the location of the called number from the calling number, through the MSRN concept, the location release of the called person remains the choice of this latter—as an ARoL subscriber.

Basic ARoL (Level 1)

With this service level (Level 1), when calling an ARoL subscriber, travelling and roaming in another country, the caller is informed via a recorded voice message:

In which country the "callee" is; and the local time there. Then, if the caller would like to continue with this initiated call or to hung up.

This recorded voice message is expected to be in two languages: English and the country official language. Of course, if the callee is switched off or out of coverage (not connected to any network), the caller will listen to the common and familiar recorded voice message, stating that the dialed number is currently unreachable. Of course, it is assumed that a roaming agreement is established between the HMNO and the network the ARoL subscriber is connected to (in the visited country). The following examples (Examples 1, 2 & 3) sketch how Basic ARoL works.

Example 1

Figure 1:
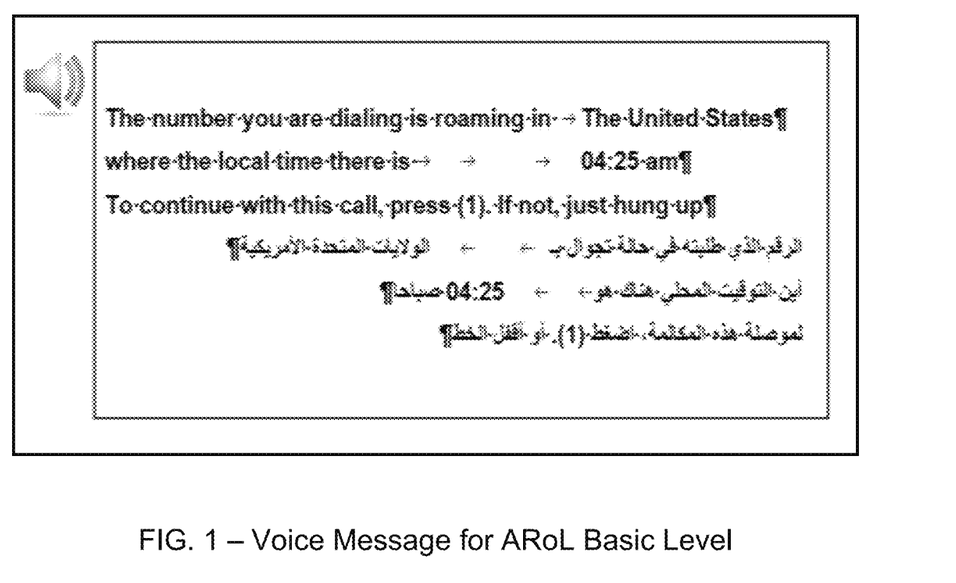
FIG. 1 shows in words (in English and in Arabic) the content of the voice message that the caller will hear, when the callee is in a roaming state.

An ARoL subscriber, with a mobile line from STC (a Telco Operator in Saudi Arabia) is in a business trip in Chicago (USA) in February. He is being called from Riyadh (Saudi Arabia) at 1:25 pm Saudi time (UTC+03:00) by a caller with a mobile line from Mobily (a second Telco Operator in Saudi Arabia). When dialing the number, and after the setup of the related call signaling, the caller (in Riyadh) will listen to the recorded voice message in both languages: English and Arabic, shown on "FIG. 1".Then, it is up to the caller to decide about the importance of the call, by either:

Pressing (1) to continue, and the callee will hear his mobile phone ringing,

Or, just hanging up and calling another time.

Notes:

If the callee is busy with another call (and call waiting is not being used), the Visited MSC routes the call to a pre-determined Call Forward Busy (CFB) number. It may be set by default to the callee voice mail.

If the callee does not answer, the Visited MSC routes the call to a pre-determined Call Forward No Reply (CFNRy) number. It may be set by default to the callee voice mail.

If the caller does nothing or presses another digit, the call will be rejected (ended).

When hanging up, or the call rejected, an SMS is forwarded to the called ARoL subscriber (the callee), informing him about an attempted call from "the caller number" at "the caller local time".

Example 2

An ARoL subscriber, with a mobile line from Saudi Telecom (STC), is in a business trip in Chicago (USA) in February. He is receiving a landline/mobile call from London (United Kingdom) at 10:25 am GMT (corresponding to 1:35 pm Saudi Time). When dialing the number, and after the setup of the related call signaling, the caller (in London) will listen to the recorded voice message in both languages: English and Arabic, shown on "FIG. 1". Then, it is up to the caller to decide about the importance of the call, by either:

Pressing (1) to continue, and the callee will hear his mobile phone ringing,

Or, just hanging up and calling another time.

Notes:

[Same notes as for Example 1]

Example 3

Figure 2:
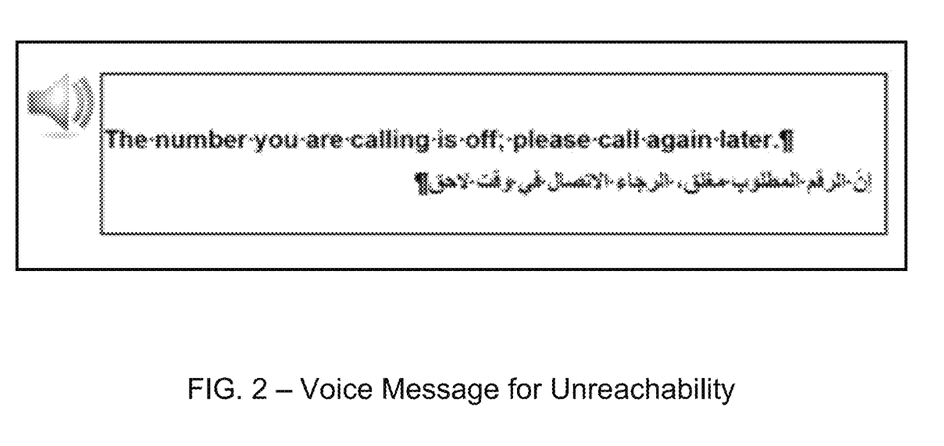
FIG. 2 shows in words (in English and in Arabic) the content of the voice message that the caller will hear, when the callee is unreachable.

An ARoL subscriber, with a mobile line from Saudi Telecom (STC), is in a business trip in Chicago (USA). His mobile phone is switched off when receiving a landline/mobile call from London at 10:25 am GMT (corresponding to 1:25 pm Saudi Time). When dialing the number, and after the setup of the related call signaling, the caller (in London) will listen to the recorded voice message in both languages, English and Arabic, shown on "FIG. 2". Then, an SMS is forwarded to the called ARoL subscriber (the callee) informing him about an attempted call from "the caller number" at "the caller local time" once his mobile is switched on and attached to a visited mobile network.

Note:

If the ARoL subscriber is either out of coverage, or his battery has gone flat/removed, the caller will listen to the above recorded voice message, in both languages: English and Arabic; and an SMS is forwarded to the called ARoL subscriber (the callee), informing him about an attempted call from "the caller number" at "the caller local time".

Advanced ARoL (Level 2)

With this service level (Level 2), when the caller is calling an ARoL subscriber, travelling and roaming in another country, the caller is informed in which country the "callee" is and the local time there. Then, the caller has the following choices:

To continue with this initiated call normally.

Or, to continue with this initiated call and assuming roaming charges.

Or, to hung up.

The caller will be informed through a recorded voice message, which is expected to be in two languages: English and the country official language. The following example (Example 4) sketches how Advanced ARoL works.

Example 4

Figure 3:
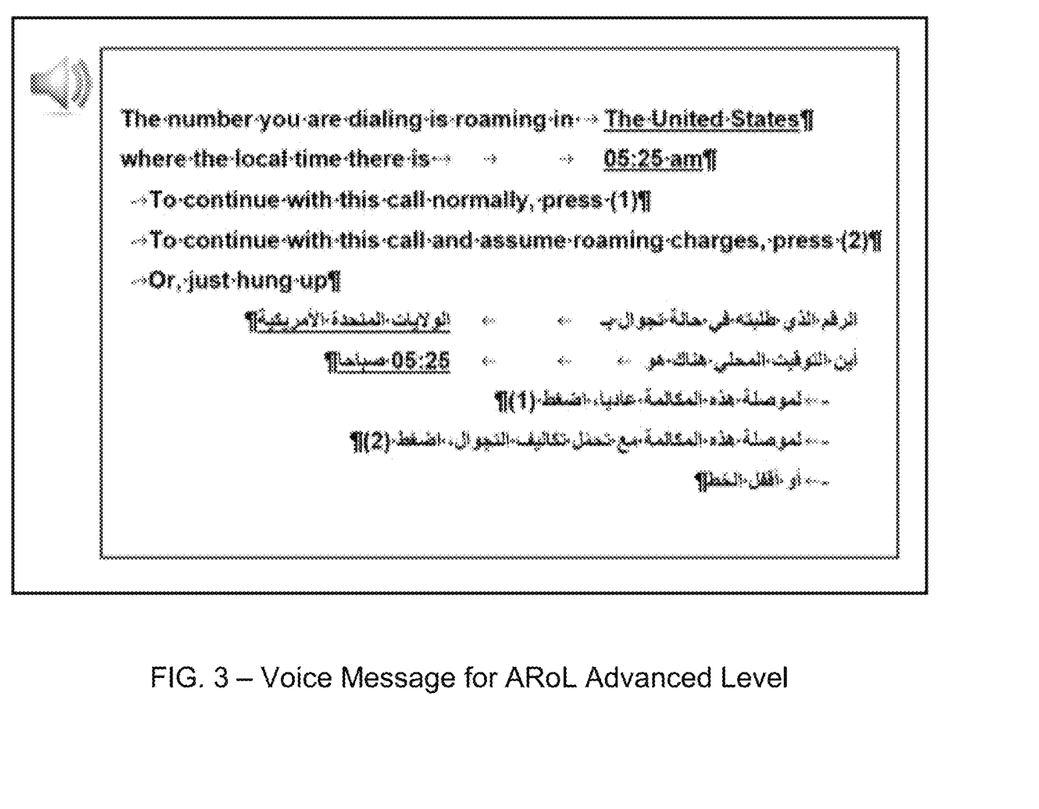
FIG. 3 shows in words (in English and in Arabic) the content of the voice message that the caller will hear, when the callee is in a roaming state.

An ARoL subscriber, with a mobile line from Saudi Telecom (STC), is in a business trip in Chicago (USA) in February. He is receiving a landline/mobile call from another Saudi Telecom (STC) customer at 1:25 pm Saudi Time. When dialing the number, and after the setup of the related call signaling, the caller will listen to the recorded voice message in both languages, English and Arabic, shown on "FIG. 3". Then, it is up to the caller to decide about the importance of the call, by:

Pressing (1) to continue, and the callee will hear his mobile phone ringing,

Or, pressing (2) to continue and assuming roaming charges, and the called ARoL subscriber will hear his mobile phone ringing, but he is advised that he is receiving a free call (Section 4).

Or, just hanging up and calling another time.

Notes:

[Same notes as for Example 1]

ARoL Service Subscriptions

The Telco Operator—providing the ARoL service—may offer two types of subscription to its customers willing to subscribe to this service:

Basic ARoL Subscription—Where there is NO distinction between callers—either customers of the HMNO or NOT. In other words, the option of assuming roaming charges is NOT offered to the caller. He is only informed about the roaming location of the callee and the local time of the city where he is; and accordingly, he makes the choice to keep with his call or to call another time (as sketched in Examples 1 & 2).

Advanced ARoL Subscription—Where there is distinction between callers—if they are customers of the HMNO or NOT. In other words:

If the caller is a customer of the HMNO, after being informed about the roaming location of the callee and the local time of the city where he is; the caller will be offered the option of assuming roaming charges (as sketched in Example 4).

If the caller is NOT a customer of the HMNO, he is only informed about the roaming location of the callee and the local time of the city where he is; and accordingly, the caller makes the choice to keep with his call or to call another time.

ARoL Subscriber Contacts Update

Based on the type of subscription, a new Advanced ARoL subscriber is expected to duplicate and update his contacts (who are, basically, customers of the HMNO) in order to detect free roaming-charges calls, when traveling abroad.

The expected type of update is based on the "2-digit" extension that the Telco Operator will attach the caller MSISDN, and which will be forward it to the callee mobile phone. Note that this "2-digit" extension is communicated by the HMNO to its new Advanced ARoL Subscriber. The following example (Example 5) sketches how a new Advanced ARoL subscriber will duplicate and update one of his existing contacts, based on the "2-digit" extension provided by his HMNO.

Example 5

Figure 4:
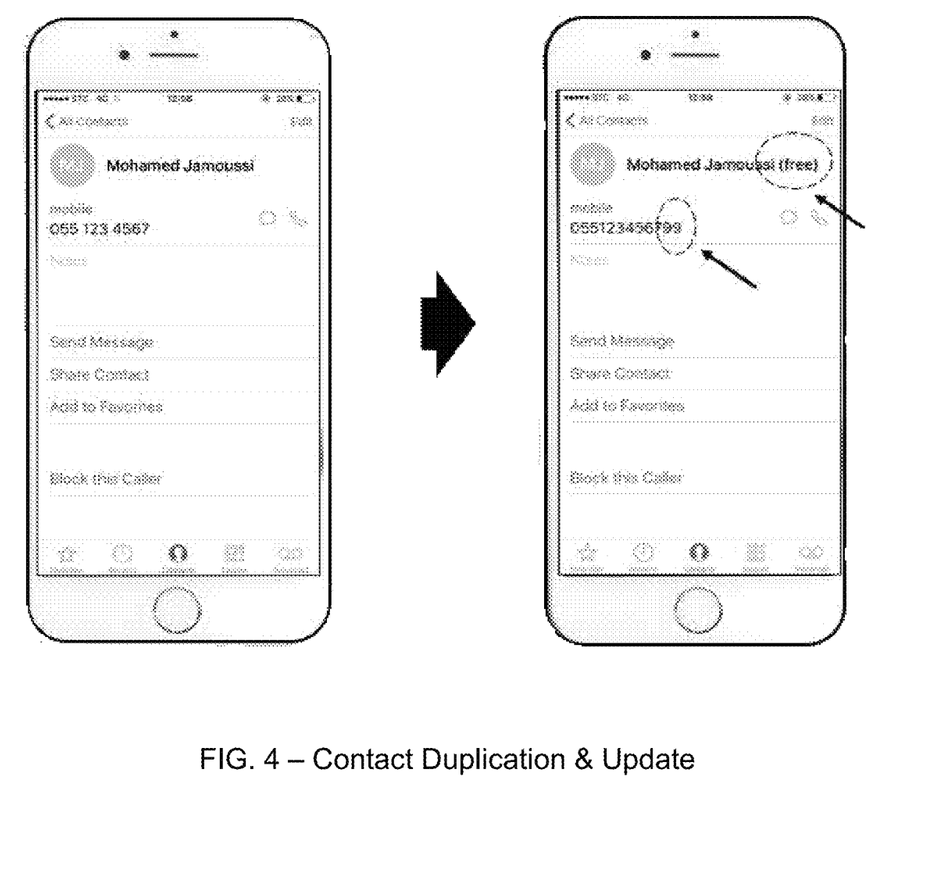
FIG. 4 shows how contacts are duplicated by adding the "2-digit" extension provided the Telco Operator. The "2-digit" extension is manually added to the MSISDN of the contact to be updated.

An ARoL subscriber, with a mobile line from line from Saudi Telecom (STC) wants to duplicate the contact of "Mohamed Jamoussi" stored on his mobile phone, based on the "2-digit" extension provided to him by Saudi Telecom and which is "99" (as an example). This contact will be duplicated and updated as shown on "FIG. 4".

Figure 5:
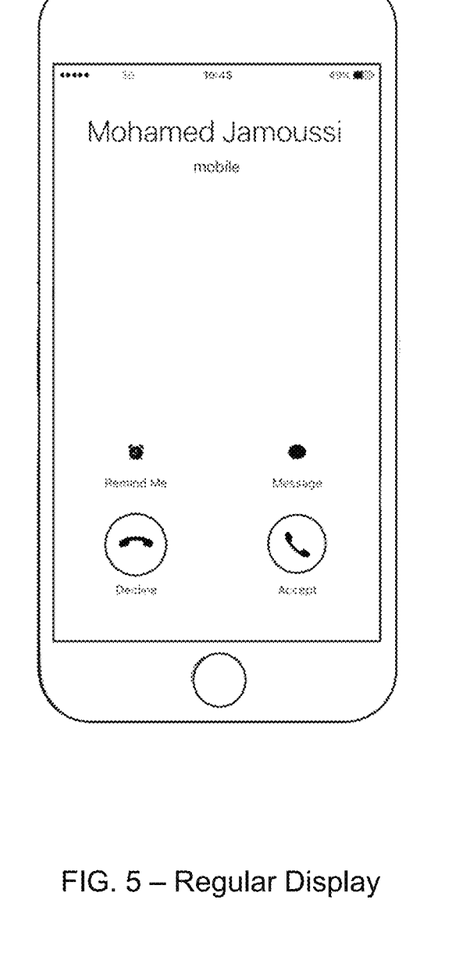
FIG. 5 shows the regular display when the caller chooses to make a normal call by pressing (1). The called ARoL subscriber is receiving a call as if he is in his home country—but assuming the international roaming cost.

When roaming abroad and receiving a call from "Mohamed Jamoussi" who has chosen to make a normal call by pressing (1), the mobile phone of the callee will display what is shown on "FIG. 5"; and the callee will assumed the roaming charges of this accepted call.

Figure 6:
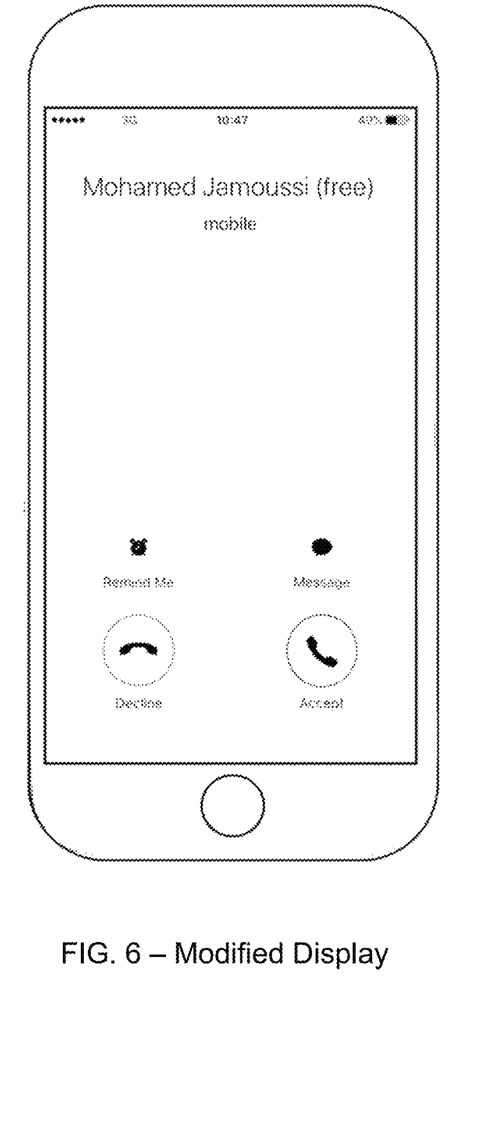
FIG. 6 shows the modified display on the called ARoL subscriber handset, as the caller chose to assume all the call costs by pressing (2). Therefore, the callee is receiving a call with NO charge though he is roaming abroad.

Now, if the caller "Mohamed Jamoussi" has chosen to assume the roaming charges for this call by pressing (2), the mobile phone of the callee will display what is shown on "FIG. 6", and the callee is advised that the caller will assume the roaming charges of this accepted call.

ARoL Server

Figure 7:
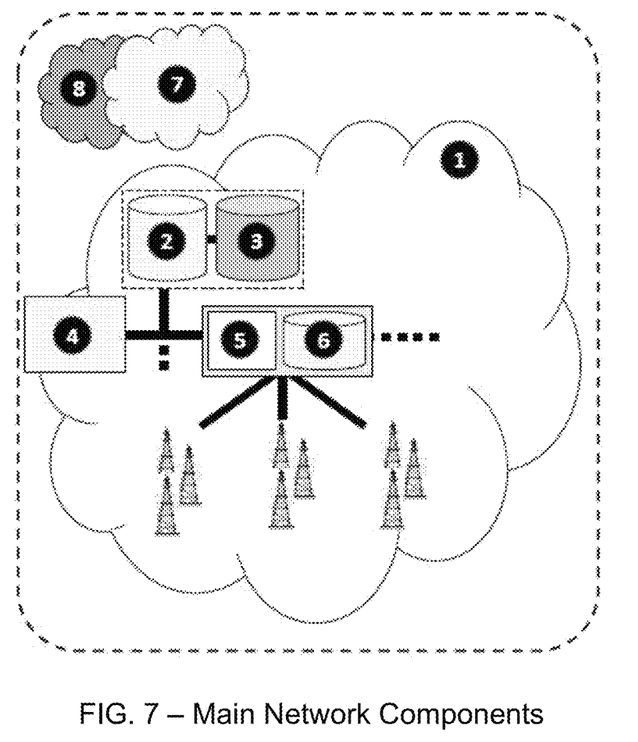
FIG. 7 shows the main components of the mobile network and how the ARoL Server is proposed to be integrated in this network. The legend of this figure is the following.

Though details may differ from one mobile network to another, but the overall architecture and key components are almost the same. For this ARoL service, an ARoL server connected to the HLR of the HMNO (or embedded) will be deployed for the voice messages related to different mobile networks that an ARoL subscriber could roam in across the world and which have roaming agreements with the HMNO (see "FIG. 7").

ARoL Service Process

When an ARoL subscriber is roaming internationally and is receiving a call, the ARoL service process is almost similar to the known roaming process. It basically involves:
  The GMSC & HLR of the HMNO, and
  The MSC & VLR of the visited network in the visited country.

ARoL Subscriber Location Identification

The first step of the ARoL service process is typically the identification mechanism of any roaming process. This step determines the location of a mobile phone connected to a visited Mobile Network and at an idle state (no active traffic).

When an ARoL subscriber, travelling abroad, switches "ON" his mobile phone (or transferred via a handover, which is the process in which a call/data session is transferred from one BTS to another without disconnection), the Visited Mobile Network—detecting this new device—will notice that it is not registered with its own system, and will identify its HMNO. Then, both networks (Visited and Home) will exchange roaming information about this mobile phone using the IMSI number and the IMSI attached procedure is executed. Of course, it is assumed that there is a roaming agreement between the two networks. If not, the mobile phone will be denied by the Visited Mobile Network.

If the Visited Mobile Network finds out that this mobile phone is allowed to roam, then it begins to maintain a temporary subscriber record for this device. The mobile phone is said to be attached. The HLR of the HMNO passes the information to the VLR in the Visited Network and updates its location information for this ARoL subscriber, so that any information sent to that device can be correctly routed. The $HLR_{HMNO}$ instructs the old VLR to delete the information it has on this ARoL subscriber.

ARoL Service Key Steps

When a caller dials the mobile phone number of an ARoL subscriber roaming abroad, the ARoL service key steps are the following:

1. The caller dials the ARoL subscriber mobile phone number ($MSISDN_{AROL}$)

2. The $MSISDN_{ARoL}$ is forwarded to the $HLR_{HMNO}$ via the $GMSC_{HMNO}$ (see "FIG. 8"). And because of previous updates, the $HLR_{HMNO}$ already knows which VLR—in the world—is serving the called AROL subscriber.

Figure 8:
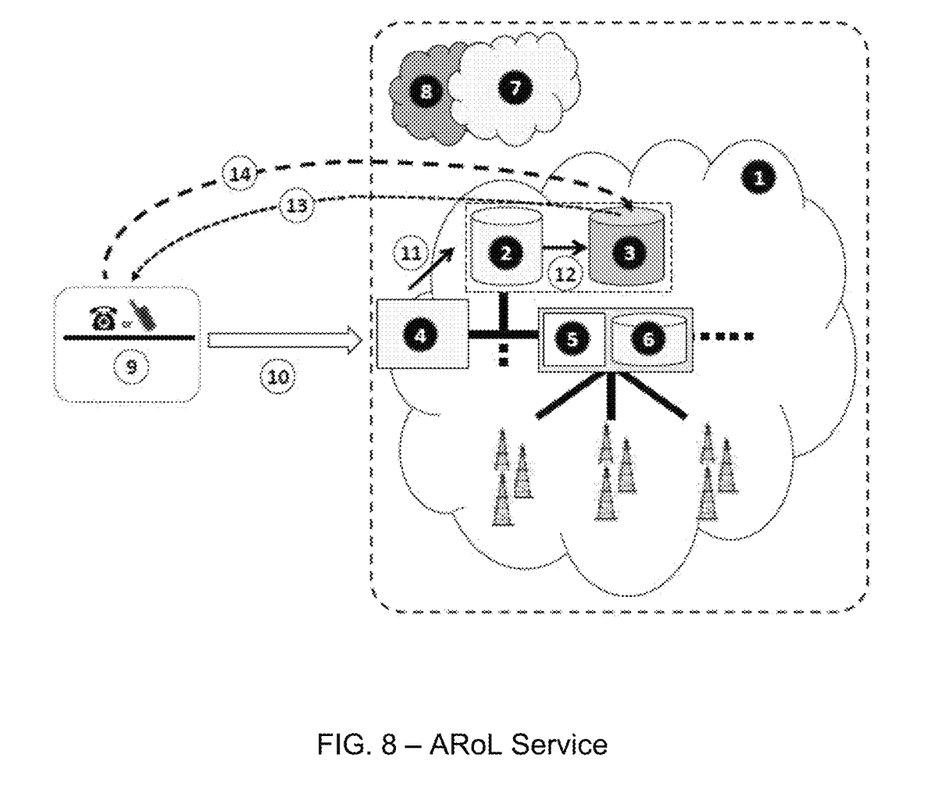
FIG. 8 shows the main components of the mobile network and how the ARoL Server is proposed to be integrated in this network. The legend of this figure is the following.

3. The $HLR_{HMNO}$ will:
   a. identify if the caller is a subscriber of the HMNO (as the callee). If so, it could be either serviced by a $VLR_{HMNO}$ or an external VLR to the HMNO (i.e. the caller is also roaming domestically or internationally)
   b. identify which AROL level, the callee is subscribed to (Basic or Advanced).
   c. instruct the AROL server to deliver the corresponding message to the caller via the $GMSC_{HMNO}$, based on the information collected in steps/sub-steps (2), (3.a) and (3.b).

4. The AROL server will deliver the appropriate message to the caller via the $GMSC_{HMNO}$.

5. The caller will make his choice, based on the options announced in the voice message.

6. If the caller just hangs up, or press an unexpected digit, or does nothing, the call is ended and an SMS is forwarded to the called AROL subscriber (the callee), informing him about an attempted call from "the caller number" at "the caller local time".

7. If the caller presses (1)—as an offered option, regardless of the information collected in sub-steps (3.a) and (3.b), the standard roaming process will take place to carry on with this initiated call. The VLR servicing the called AROL subscriber will assign an MSRN (a temporary number). This MSRN number will be sent back to the $HLR_{HMNO}$, so that the $GMSC_{HMNO}$ knows how to route the call to reach the AROL subscriber. Note that, broadly speaking, the $GMSC_{HMNO}$ will attach the MSISDN of the caller to the provided MSRN, so that the AROL subscriber identifies who is calling.

From a billing standpoint, termination billing procedure and rate are applied, as per the agreement between the HMNO and the caller Telco Operator.

Notes:
     For the called AROL subscriber:
       If he is a postpaid subscriber, once the call is ended, the billing is made.
       If he is a prepaid subscriber, a check is made to see if he has enough credit to receive this call. If so, the call is continually monitored and the appropriate amount is decremented from his account. When the credit reaches zero, the call is cut off.
     For the caller (either a subscriber of the HMNO or NOT):
       If he is a postpaid subscriber, once the call is ended, the billing is made.
       If he is a prepaid subscriber, a check is made to see if he has enough credit to receive this call. If so, the call is continually monitored and the appropriate amount is decremented from his account. When the credit reaches zero, the call is cut off.

8. If the caller presses (2)—as an offered option, and based on the information collected in steps/sub-steps (2), (3.a) and (3.b), the standard roaming process will take place to carry on with this initiated call. The VLR servicing the called AROL subscriber will assign an MSRN (a temporary number). This MSRN number will be sent back to the $HLR_{HMNO}$, so that the $GMSC_{HMNO}$ knows how to route the call to reach the AROL subscriber.

At this stage, the $GMSC_{HMNO}$ will NOT attach the original MSISDN of the caller to the provided MSRN. Instead, the $GMSC_{HMNO}$ will attach the extended MSISDN of the caller, which is a combination of the original MSISDN and a "2-digit" extension (as explained in Section 4). Therefore, as per Example 5 and updated contacts, the called ARoL subscriber will identify that he is receiving a free of charge call (as displayed on his mobile phone screen).

Notes:
  For the called ARoL subscriber, he is receiving the call for free—as if he is receiving it in his home country.
  For the caller (who is a subscriber of the HMNO), he will assume the charges of both:
    The call made to the ARoL subscriber, as if he is in his home country.
    The call received by the ARoL subscriber in the country where he is.
  On another hand, depending on the caller type of subscription:
    If he is a postpaid subscriber, once the call is ended, the billing is made.
    If he is a prepaid subscriber, a check is made to see if he has enough credit to receive this call. If so, the call is continually monitored and the appropriate amount is decremented from his account. When the credit reaches zero, the call is cut off.

ARoL Subscriber Off

When the ARoL subscriber mobile phone is powered off, it sends an IMSI detach message to the network. The VLR marks that mobile phone as detached and informs the $HLR_{HMNO}$ (via the $GMSC_{HMNO}$) that it is about to remove this subscriber record from its register (VLR register). The $HLR_{HMNO}$ then treats this ARoL subscriber as unreachable. Therefore, any caller dialing this ARoL subscriber number will be treated as sketched in Example 3.

Also, if the mobile phone is out of the area of coverage, it will miss sending a registration message to the network at the predefined intervals. Accordingly, the network will mark it as detached; and any caller dialing this mobile number will be treated as sketched in Example 3.

ARoL Service Business Aspects:

Drivers & Targeted Segments:

The ARoL service can be offered to all business and residential, postpaid and prepaid customers. By offering this service, a Mobile Operator will aim to:
  Offer a service that attracts frequent travelers, interested by substantially reducing their international communications spending, and limiting inconvenient incoming calls.
  Offer a service that conveys a message on behalf of the "callee" when feeling embarrassed to do it himself (e.g. advising the caller that he is internationally roaming in order to make this call as short as possible, or the time is inconvenient)
  Offer a service that conveys a message expressing some show-off desires for certain categories of customers
  Match "Early Services/Technologies" adopters' expectations—constantly searching for new services/technologies.
  Increase customers' retention and loyalty
  Generate new revenues and increase ARPU Policies & Pricing:

Basically, the overall ARoL service policies & pricing are established by the Mobile Operator, providing this service. Nevertheless, it is expected that:
  Service Activation/Cancellation—at no fees
  Service Charges—through monthly/weekly subscriptions, or based on usage As it can be a free service for retention purposes or bundled with other services. It is the Operator Marketing authority which decides on the service charging rules.

Definitions & Acronyms

1. ARoL service—Announced Roaming Location service
2. ARoL subscriber—A customer subscribed to the ARoL service. Of course, as an ARoL subscriber, he/she is assumed to have the IMR service with his/her Telco Operator (See Definition 12 for IMR service).
3. BSC—Base Station Controller, which controls a given number of BTSs (towers) (See Definition 4 for BTS).
4. BTS—Base Transceiver Station, which is the tower radiating the signal to the mobile.
5. Callee—The person being called (or intended to be called).
6. Caller—The person who is calling (or attempting to call). In this document, he can be:
   a. calling locally (On-Net or Off-Net) or internationally, using a mobile network or a landline network.
   b. a customer of the same operator as the callee, or not.
   c. an ARoL subscriber, or not.
7. GMSC—Gateway MSC (See Definition 14 for MSC).
8. $GMSC_{HMNO}$—GMSC of the HMNO (See Definition 9 for HMNO)
9. HMNO—Home Mobile Network Operator, hosting the ARoL subscriber.
10. HLR—Home Location Register, storing the details of the all the subscribers permanently.
11. $HLR_{HMNO}$—HLR of the HMNO
12. IMR service—International Mobile Roaming service, granting a subscriber an automatic access to the visited operator (in the visited country) when arriving and, then, seamlessly using his mobile phone/device (voice calls, text messages, Internet . . . ).
13. IMSI—International Mobile Subscriber Identity (identity of the SIM card). It identifies the mobile station, its home wireless network, and its home country.
14. MSC—Mobile Switching Center, controlling a given number of BSCs and responsible for switching calls to called subscribers.
15. MSISDN—Mobile Station International Subscriber Directory Number. It is the number used for routing the call to the subscriber (dialed number to connect to a mobile phone).
16. $MSISDN_{AROL}$—MSISDN of the ARoL subscriber
17. MSRN—Mobile Station Roaming Number. It is allocated by the VLR (from a list of numbers it holds) in order to route the call from the mobile phone to the MSC (via the BTS/BSC) (See Definition 21 for VLR).
18. NITZ—Network Identity and time Zone.
19. SIM—Subscriber Identity Module.
20. Telco Operator—It can be a Mobile Operator, a Landline Operator, or both.
21. VLR—Visitor Location Register, storing the details of the all the visiting subscribers temporarily, as long as they are "active" in the particular area it covers.
22. $VLR_{HMNO}$—VLR of the HMNO.

The invention claimed is:

1. A method for managing an initiated call between a caller and a roaming callee, where the caller and the roaming callee are both subscribers of a same mobile network operator, this method includes:
   a step of duplication and update of an existing contact stored in the roaming callee mobile phone to an extended contact, said existing contact being the contact of the caller, and the extended contact including the existing contact and a 2-digit predefined extension;
   a step of informing the caller about the roaming callee roaming information, following the step of informing, a step of offering the caller a plurality of options to continue with the initiated call,
   said plurality of options including a first option to continue with the initiated call and assuming roaming charges;
   when the caller chooses the first option, a step of displaying to the roaming callee the extended contact of the caller and informing the roaming callee that he/she is receiving a free of charges call.

2. The method of claim 1, wherein the roaming information includes a location of the roaming callee and a local time at the location.

3. The method of claim 1, wherein said plurality of options further includes a second option to continue with the initiated call without assuming the roaming charges, the method further comprises a step of displaying to the roaming callee the existing contact.

4. The method of claim 1, wherein said plurality of options further includes a third option to hang up.

5. The method claim 4, wherein the method further comprises, when the caller chooses the third option, a step of informing the roaming callee about an attempted call from the caller and a local time of the caller.

6. A mobile network including:
   a server (3) for managing an initiated call between a caller and a roaming callee, the caller and the roaming callee being both subscribers of a same mobile network; said server (3) being configured to:
      inform the caller about roaming information of the roaming callee;
      inform the caller about a plurality of options to continue with the initiated call,
   said plurality of options including a first option to continue with the initiated call and assuming roaming charges; and
   a Gateway Mobile Switching Center (GMSC) configured, when the caller chooses the first option, to attach to a provided Mobile Station Roaming Number (MSRN) allocated by a Visitor Location Register (VLR) to which the roaming callee is attached, a predefined extended Mobile Station International Subscriber Directory Number (extended-MSISDN) including the Mobile Station International Subscriber Directory Number (MSISDN) of the caller and a 2-digit predefined extension and informing the roaming callee, via a display, that he/she is receiving a free of charges call.

\* \* \* \* \*